Patented Aug. 23, 1927.

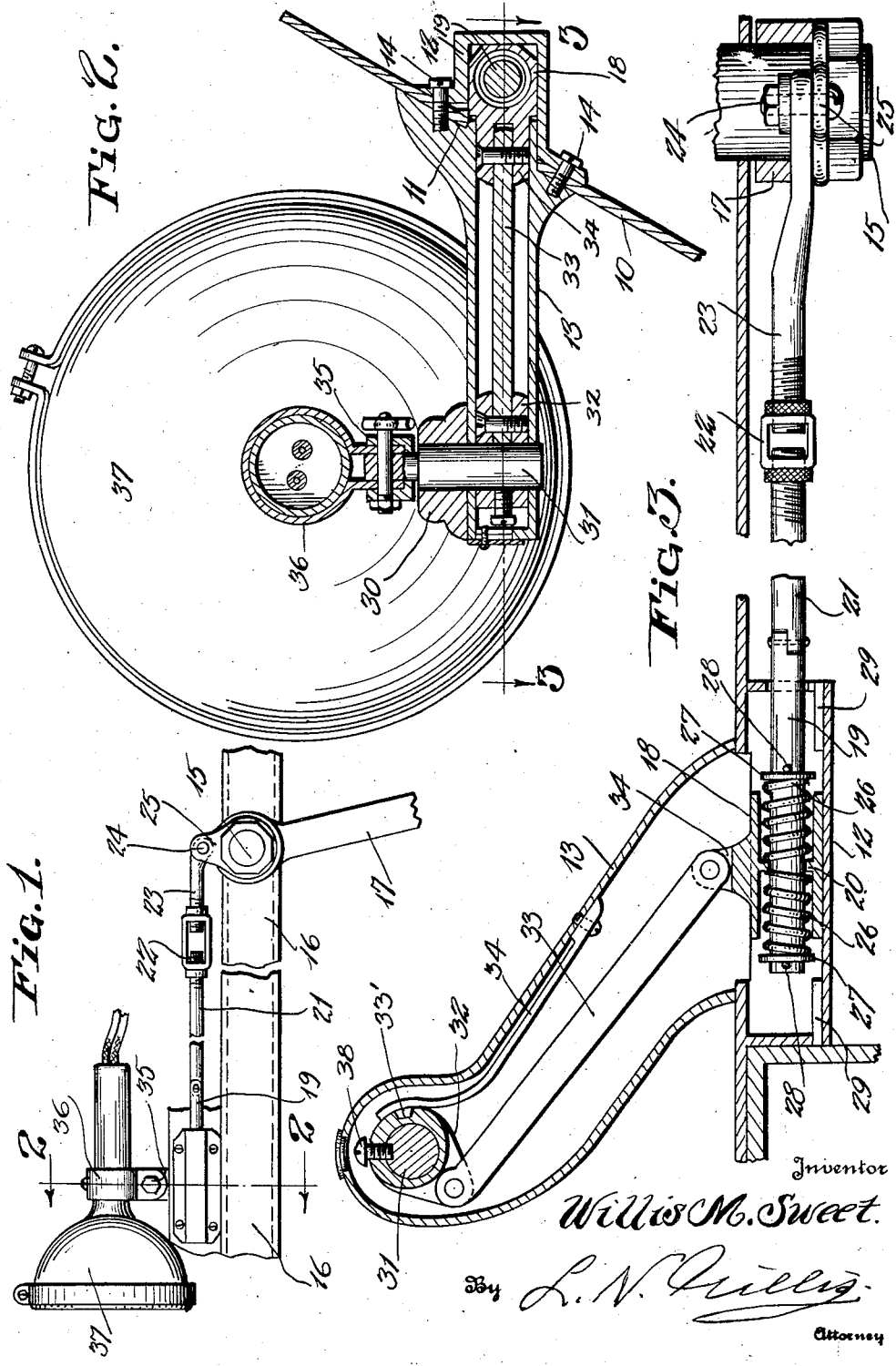

1,639,865

UNITED STATES PATENT OFFICE.

WILLIS M. SWEET, OF NILES, MICHIGAN.

DIRIGIBLE HEADLIGHT.

Application filed December 7, 1926. Serial No. 153,160.

This invention relates to dirigible spot lights for automobiles and has special reference to an improvement in the operating mechanism for such spot lights as shown and described in my prior Patent Number 1,599,689, dated September 14, 1926.

In the usual construction of dirigible spot lights which are connected to the steering gear in such manner that the angle of direction of the spot light corresponds to the angle at which the steering wheels are set in turning, difficulty is experienced because the spot light does not turn quickly enough to show the side of the road to which the vehicle is about to move and where the wheels are set at a small angle, the beam from such spot light strikes the side of the road so far in advance of the position of the car that the car may run entirely off the road without the operator being aware of his danger.

The principal object of the present invention is to provide a dirigible spot light so connected to the steering mechanism of the automobile that a slight movement of such steering mechanism will cause the beam of the spot light to move quickly to the proper side of the road, the mechanism being so arranged that the wheels may be swung further by the usual steering mechanism without causing further movement of the spot light beam. In other words, the actuating mechanism of the spot light causes the beam from the latter to move in the desired direction in advance of the movement of the wheels to its extreme position, the wheels being afterward capable of also moving to extreme angular position.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a side elevation of a spot light controlling mechanism constructed in accordance with this invention.

Figure 2 is an enlarged detail section on the line 2—2 of Figure 1.

Figure 3 is a detail section on the line 3—3 of Figure 2.

In the construction of this invention the fender 10 of the automobile is provided with a suitable opening 11 and on one side of this opening is mounted a substantially rectangular casing 12 while the other side of the fender carries a casing in the form of a hollow arm 13, these two casings being secured together by screws 14 passing through the fender. Mounted on a pivot 15 secured to the frame 16 of the automobile is the usual steering arm 17 connected in the ordinary manner to one of the steering knuckles of the automobile, it not being deemed necessary here to show this connection. Slidable in the casing 12 is a hollow crosshead having a body 18 wherethrough passes a connecting rod end 19 which slides through a collar 20. This connecting rod end is pivotally connected to a connecting rod body 21 which is in turn adjustably connected by means of a turn buckle 22 to a connecting rod end 23 pivoted by a pivot 24 to a finger 25 carried by the steering arm 17. On each side of the collar 20, which is fixed in the body 18, a spring 26 surrounds the rod end 19 and on this rod end are mounted collars 27 held by pins 28 so that the springs 26 are held between these collars and the collar 20. Thus any movement of the arm 17 tends to communicate movement to the crosshead body 18 but this movement is limited in extent by suitable stops 29 which may be of any desired character but are positioned at opposite ends of the crosshead in normal spaced relation thereto. Under these circumstances the crosshead can move and will move under the action of the arm 17 until it engages one of these stops. The arm 17 may then continue to move without further movement of the crosshead, merely effecting compression of one of the springs 26. Carried by the end of the casing 13 is a bearing 30 wherein is mounted a vertical shaft 31 to which is secured a short rock arm 32 connected by a link 33 with an arm 34 projecting from the crosshead body 18. This rock arm 32 is provided with a notch 33' receiving a lug on the free end of a spring 34 secured in the casing 13 so that when the shaft 31 is turned to its normal or central position the shaft will be held against accidental rotation. Secured by a suitable bolt and wing nut 35 to the top of the shaft 31 is a bracket 36 carrying the spot light 37 which may be a drum light or other type of spot light. By this means the spot light may be tilted downwardly or upwardly at will.

Now the proportions of these parts are such that as the arm 17 starts to move the rock arm 32 and the shaft carried thereby will move, as in my prior patent, with a greater angular velocity than the wheels controlled by the arm 17 and this movement will continue until the rock arm 32 has caused the spot light 37 to swing to the extreme limit of its movement. At this time the body 18 of the crosshead will contact with one of the stops 29 and the wheels of the vehicle will have been only slightly changed from their normal or straight ahead position. Further movement to turn these wheels to a more acute angle is permitted by reason of the fact that the connecting rod end 19 may slide through the crosshead as before noted and this movement may continue until the wheels have also reached the limit of their angular adjustment from the normal position.

Obviously, the turn buckle 22 may be used to adjust the device to different lengths of automobiles and also the set screw 38 is used to adjust the spot light so that it will direct a beam straight ahead when the wheels are set in corresponding position.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In combination, a pivoted steering arm, a crosshead mounted for reciprocation, stops limiting the movement of said crosshead, a connecting rod having one end connected to the steering arm and slidable through said crosshead, said arm being arranged to move between limits greater than necessary to move the crosshead into engagement with its stops, spring means connecting the crosshead and rod arranged to hold the crosshead normally central between points on the rod and to permit it to move against the influence of said means to each of said points, a spot light, a shaft carrying the spot light and journalled to pivotally support said light, a rock arm on said shaft, an arm on said crosshead, a link connecting said rock arm and the last mentioned arm, and yieldable pawl means normally holding the spot light in central position between the limits of its movement.

2. In combination, a pivoted steering arm, a crosshead mounted for reciprocation, stops limiting the movement of said crosshead, a connecting rod having one end connected to the steering arm and slidable through said crosshead, said arm being arranged to move between limits greater than necessary to move the crosshead into engagement with its stops, spring means connecting the crosshead and rod arranged to hold the crosshead normally central between points on the rod and to permit it to move against the influence of said means to each of said points, a spot light, a shaft carrying the spot light and journalled to pivotally support said light, a rock arm on said shaft, an arm on said crosshead, a link connecting said rock arm and the last mentioned arm, said rock arm having a notch in its periphery, and a spring pawl fixed at one end in spaced relation to the rock arm and at its other end bearing against said rock arm, said spring pawl being adapted to engage the notch in the rock arm and hold the rock arm yieldably against movement with the headlight centrally positioned.

In testimony whereof I affix my signature.

WILLIS M. SWEET.